United States Patent [19]

Shoji et al.

[11] Patent Number: 4,771,346

[45] Date of Patent: Sep. 13, 1988

[54] METHOD AND APPARATUS FOR REWRITING ON A MAGNETIC DISK ON WHICH DATA HAS BEEN WRITTEN BY ANOTHER APPARATUS HAVING HALF THE TRACK DENSITY CAPABILITY OF THE FIRST APPARATUS

[75] Inventors: Makoto Shoji, Akigawa; Hiroshi Tsuyuguchi, Tokyo; Yoshiaki Sakai, Higashikurume, all of Japan

[73] Assignee: Teac Corporation, Tokyo, Japan

[21] Appl. No.: 60,063

[22] Filed: Jun. 9, 1987

[30] Foreign Application Priority Data

Jun. 9, 1986 [JP] Japan ................... 61-133111

[51] Int. Cl.$^4$ .................. G11B 5/86; G11B 5/09; G11B 5/03
[52] U.S. Cl. .................... 360/15; 360/48; 360/66; 360/78
[58] Field of Search ............ 360/48, 15, 61, 62, 360/63, 66, 78, 121

[56] References Cited

U.S. PATENT DOCUMENTS 4,298,897 11/1981 Arrer et al. ............. 360/48
4,622,601 11/1986 Isozaki et al. ............ 360/48
4,644,421 2/1987 Miwa et al. ............. 360/66

OTHER PUBLICATIONS

"Latest Floppy Disk Drives and Their Application Knowhow", Shoji Takahasi, published Jun. 10, 1984.

Primary Examiner—Vincent P. Canney
Attorney, Agent, or Firm—Woodcock Washburn Kurtz Mackiewicz & Norris

[57] ABSTRACT

A floppy disk drive (FDD) capable of data transfer with a track density of, typically, 96 tracks per inch (TPI) is adapted for rewriting on a floppy disk on which data has been written on concentric data tracks by a 48-TPI FDD. The data tracks, each with a width W1, are arranged with a pitch P1 on the disk. The 96-TPI FDD has a magnetic head assembly comprising a read/write head capable of providing a data track width W2 of 0.4 W1 to 0.6 W1, and a pair of tunnel erase heads each capable of providing an erase width of (W1−W2)/1 to (P1/2−W2). The opposite edge portions of each prewritten data track on the disk are erased by the erase heads of the head assembly, with the latter successively positioned intermediate the data tracks. Either before or, preferably, after the erasure of the edge portions of the prewritten data tracks, the head assembly is positioned on the successive data tracks for rewriting thereon by the read/write head, with the erase heads maintained in operation for the complete erasure of the old data during the writing of new data.

12 Claims, 7 Drawing Sheets

METHOD AND APPARATUS FOR REWRITING ON A MAGNETIC DISK ON WHICH DATA HAS BEEN WRITTEN BY ANOTHER APPARATUS HAVING HALF THE TRACK DENSITY CAPABILITY OF THE FIRST APPARATUS

BACKGROUND OF THE INVENTION

Our invention relates generally to the establishment of compatibility between devices designed for data transfer with magnetic storage media, such as flexible magnetic disks commonly known as floppy disks, with different track densities (i.e. the number of data tracks on the disk per unit distance in its radial direction). More specifically, our invention concerns a method of rewriting part or whole of data that has been written on a floppy disk by a first floppy disk drive (FDD) with a first track density, by means of another FDD designed for data transfer with a second track density that is twice as high as the first track density. Our invention also specifically pertains to the improved construction of apparatus comprising the second FDD. Typically, the first track density is 48 tracks per inch (TPI) or 18.9 tracks per centimeter, and the second track density is 96 TPI or 37.8 tracks per centimeter.

While 5.25-inch FDDs were initially developed for data transfer with a track density of 48 TPI, more recently they have been adapted for a twice as high track density of 96 TPI, the primary purpose being greater data storage capacity. The 96-TPI track density has been chosen by reason of the desired compatibility of the 48- and 96-TPI FDDs with the same floppy disks. Both types of FDDs incorporate magnetic read/write head assemblies of the tunnel erase type for trimming track edges. Reference may be had to "Latest Floppy Disk Drives and Their Application Knowhow" by Shoji Takahashi, published June 10, 1984, for further details on the compatibility of the 48- and 96-TPI FDDs.

As an illustration of the compatibility of the 48- and 96-TPI FDDs, let us assume that the 48-TPI FDD writes on a floppy disk. Part or all of the data thus written on the disk can then be rewritten by the 96-TPI FDD that has been adapted for the 48-TPI capability. Then the rewritten disk may be read by the 48-TPI FDD, although it may of course be read by the 96-TPI FDD. Such compatibility between the 48- and 96-TPI FDDs stands on the requirement that there be little or no mistracking of the head assemblies of both FDDs. If this requirement is fulfilled, the old data that has been written by the 48-TPI FDD will be practically completely erased by the tunnel erase head assembly from both sides of each new data track during the rewriting of the disk by the 96-TPI FDD in the 48-TPI mode.

Actually, however, substantial mistracking will take place in either the 48- or 96-TPI FDD, due for example to unavoidable manufacturing errors. Such mistracking will result in the misalignment of the data tracks formed by the two different FDDs, to such an extent that the pair of tunnel erase heads of the 96-TPI FDD become unable to erase parts of the old data tracks created by the 48-TPI FDD. The incomplete erasure of the old data will present no problem at all if the new data is read by the 96-TPI FDD. A problem does, however, arise when the rewritten disk is read by the 48-TPI FDD, because then its head assembly will scan not only the new tracks but also the incompletely erased old tracks.

SUMMARY OF THE INVENTION

We have hereby discovered how to preclude the possibility of incomplete erasure of the old data on a magnetic disk during rewriting thereon, in the face of the possible mistracking of the head assembly in either or both of the two different track density FDDs or equivalent devices.

Briefly stated in one aspect thereof, our invention concerns a method of rewriting on a magnetic disk on which data has been written on a plurality of concentric data tracks by a first disk drive, the data tracks being arranged on the magnetic disk with a prescribed pitch P1 and each having a width W1. Accorind to the method there is provided a second disk drive comprising a magnetic head assembly having both a read/write head and a pair of erase heads disposed on both sides of the read/write head. The read/write head has a read/write gap capable of providing a track width W2 which is in the range of 0.4 W1 to 0.6 W1, and each erase head has an erase gap capable of providing an erase width E2 which is in the range of $(W1-W2)/2$ to $(P1/2-W2)$. This head assembly is successively positioned intermediate the existing data tracks on the disk for erasing the opposite edge portions of each data track by the pair of erase heads. As required or desired, the read/write head of the head assembly may also be held in operation in an erase mode during such partial erasure of the data tracks. New data is written on the old data tracks by the read/write head of the head assembly, with the erase heads maintained in operation during the rewriting.

The method of our invention permits the writing of new data on the disk can either before or after the erasure of the opposite edge portions of the old data tracks. If the opposite edge portions of the old data track are trimmed off before rewriting, as in a preferred embodiment disclosed herein, then the old data tracks of reduced width can be completely erased as the head assembly rewrites thereon by the read/write head, with the erase heads maintained in operation during the rewriting. No old data will be left unerased even if substantial mistracking takes place in the first or second disk drive.

Another aspect of our invention concerns apparatus for use in the practice of the above summarized method. Equivalent to the noted second disk drive, the apparatus is capable of rewriting on a magnetic disk on which data has been written on a plurality of concentric data tracks arranged with a prescribed pitch P1, each data track having a width W1. The apparatus comprises a magnetic head assembly having a read/write head and a pair of erase heads disposed on both sides of the read/write head, the read/write head having a read/write gap capable of providing a track width W2 which is in the range of 0.4 W1 to 0.6 W1, each erase head having an erase gap capable of providing an erase width E2 which is in the range of $(W1-W2)/2$ to $(P1/2-W2)$. The apparatus further comprises head control means for setting the read/write head and erase heads of the head assembly in and out of operation, head positioning means including a head positioning motor for incrementally transporting the head assembly across the data tracks on the magnetic disk, first circuit means connected to the head positioning motor for causing the head positioning means to position the head assembly on any selected one of the data tracks on the magnetic disk, and second circuit means associated with the first circuit means for causing the head positioning means to successively position the head assembly intermediate the data tracks on the magnetic disk.

So constructed, the apparatus can rewrite on the disk, completely erasing the old data that has been written thereon, in accordance with the method of our invention.

The above and other features and advantages of our invention and the manner of realizing them will become more apparent, and the invention itself will best be understood, from a study of the following description and appended claims, with reference had to the attached drawings showing the preferred embodiment of our invention.

DESCRIPTION OF THE PREFERRED EMBODIMENT

Figure 1:
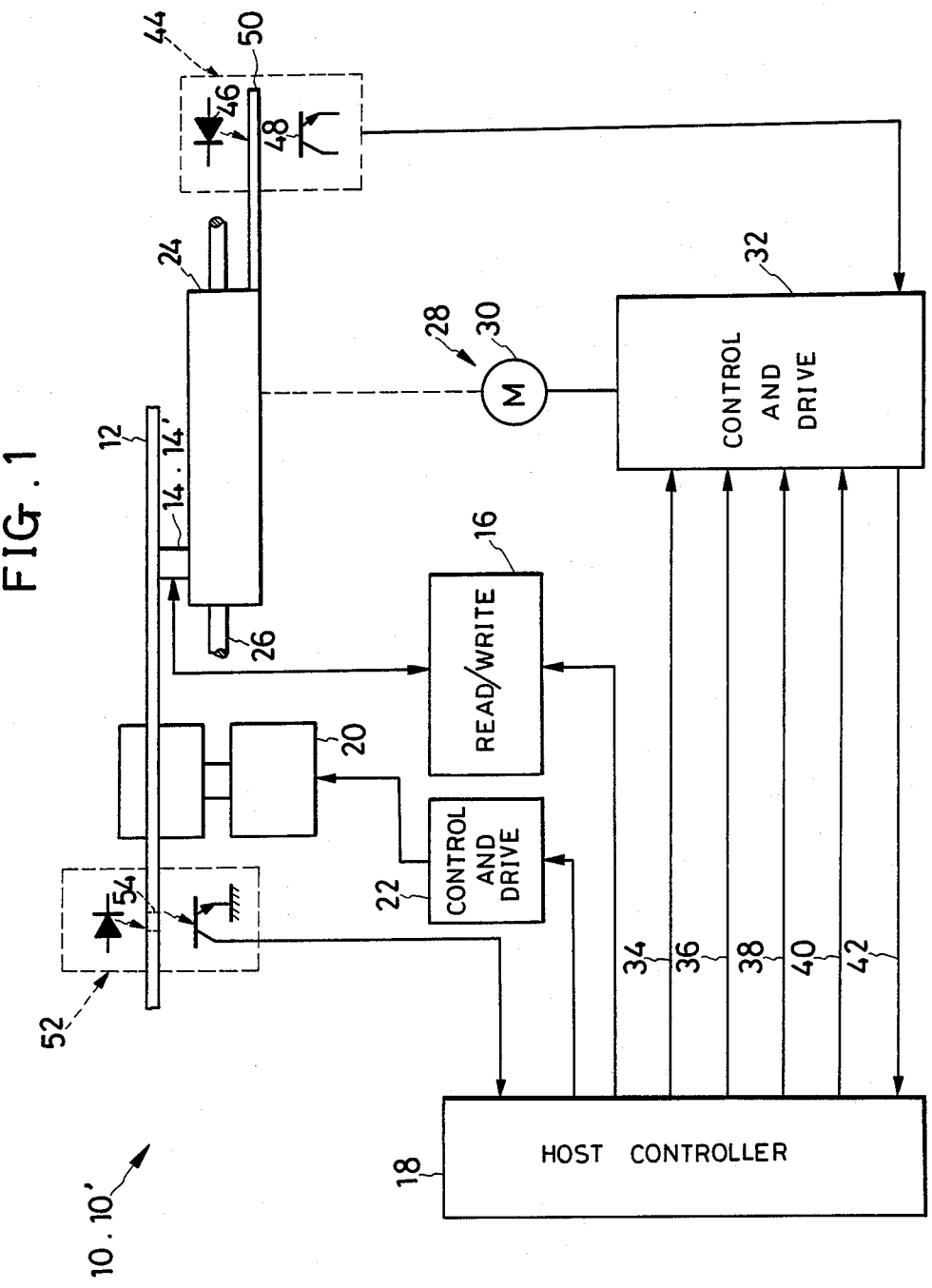
FIG. 1 is a schematic representation of some essential parts of both 48- and 96-TPI FDDs for use in the practice of our invention, shown together with a block diagram of the electric circuitry associated with the FDDs.

The 48- and 96-TPI FDDs for use in the practice of our invention can be of substantially the same configuration except for their magnetic head assemblies. In FIG. 1, therefore, we have illustrated such common configuration of the 48-TPI FDD 10 and 96-TPI FDD 10', together with a floppy disk 12 loaded therein, insofar as is necessary for a full understanding of our invention. We assume for the convenience of description that the floppy disk 12 is of the single-sided type, only one of its opposite sides being used for data transfer with a 48-TPI magnetic head assembly 14 in the FDD 10 or with a 96-TPI magnetic head assembly 14' in the FDD 10'. The head assemblies 14 and 14' are shown in more detail in FIGS. 3 and 4, respectively, to which we will refer back presently. A read/write circuit 16 is connected to the head assembly 14 or 14' for controlling data transfer between the head assembly and the floppy disk 12 under the direction of a controller 18. This controller constitutes a part of host equipment external to the FDD 10 or 10'.

Both FDDs 10 and 10' include an electric disk drive motor 20 for imparting rotation to the floppy disk 12. The rotation of the disk drive motor 20, and therefore of the floppy disk 12, is also controlled by the external host controller 18 via a control and drive circuit 22.

The head assembly 14 or 14' is conveniently mounted on a head carriage 24 movable along a guide bar 26 for transporting the head assembly radially of the floppy disk 12. A head-positioning mechanism 28 comprising a head-positioning motor 30 of the electric, bidirectional stepping type is coupled to the head carriage 24 for incrementing the same back and forth along the guide bar 26. The stepping motor 30 is connected to another control and drive circuit 32 thereby to be driven under the direction of the external host controller 18. This controller 18 is coupled to the stepping motor control and drive circuit 32 via a stepping direction signal line 34, stepping signal line 36 and Track Zero signal line 42, as has been known heretofore. Additionally, at least in the 96-TPI FDD 10', the controller 18 is coupled to the stepping motor control and drive circuit 32 via a "double track density" signal line 38 and "overrun" signal line 40 in accordance with the novel concepts of our invention, as will be later explained in more detail.

Also connected to the stepping motor control and drive circuit 32 is a Track Zero sensor 44 which is standard with this type of FDD. The Track Zero sensor 44 comprises a light source 46, a photodetector 48 arranged to be irradiated by the light source, and a photointerrupter 50 coupled to the head carriage 24 to selectively intervene between light source 46 and photodetector 48 depending upon whether the head assembly 14 or 14' is in the Track Zero position on the floppy disk 12 or not.

At 52 is shown an index sensor of standard design for optically sensing an index hole 54 foremed eccentrically in the floppy disk 12. The index sensor 52 is connected to the controller 18 for delivering thereto a series of index pulses indicative of the rotative speed and angular position of the floppy disk 12. It is to be noted that the external host controller 18 is programmed to establish an erase mode in accordance with our invention in response to an erase command and the output from the index sensor 52.

Figure 2:
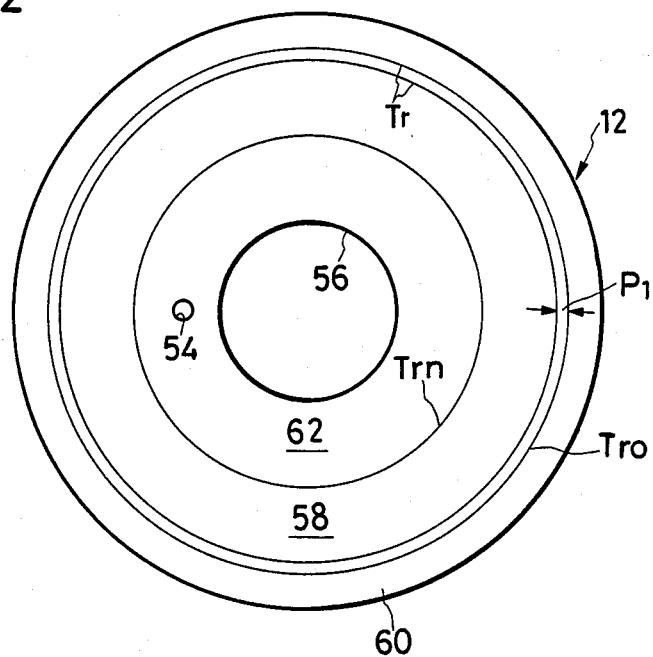
FIG. 2 is a plan view of the floppy disk for use with the FDDs of FIG. 1.

As illustrated in detail in FIG. 2, the floppy disk 12 has a plurality of data tracks Tr formed concentrically on one of its opposite sides. These data tracks are arranged with a density of 48 TPI and a prescribed pitch P1. The data tracks Tr include an outermost Track Zero Tr0, spaced a prescribed distance radially inwardly from the disk periphery, and an inmost track Trn spaced a prescribed distance radially outwardly from a central aperture 56 of the disk. The tracks Tr0 and Trn constitute the boundaries of an annular data storage region 58, leaving an outer non-storage region 60 and an inner non-storage region 62. The aforesaid index hole 54 is formed in the inner non-storage region 62.

As is standard with floppy disks in general, Track Zero Tr0 constitutes the home track on which the head assembly 14 or 14' is to be positioned for initialization. However, in accordance with our invention, the 96-TPI head assembly 14' of the FDD 10' is to be initialized, preparatory to the rewriting or erasing of the data written by the 48-TPI FDD 10, on notional Track Minus One, not shown in FIG. 2, which is disposed in the outer non-storage region 60 and which is spaced half the pitch P1 from Track Zero Tr0. The noted "overrun" signal from the external host controller 18 directs such positioning of the 96-TPI head assembly 14' on Track Minus One, with the head assembly 14' then overrunning the outer boundary of the data storage region 58.

Figure 3:
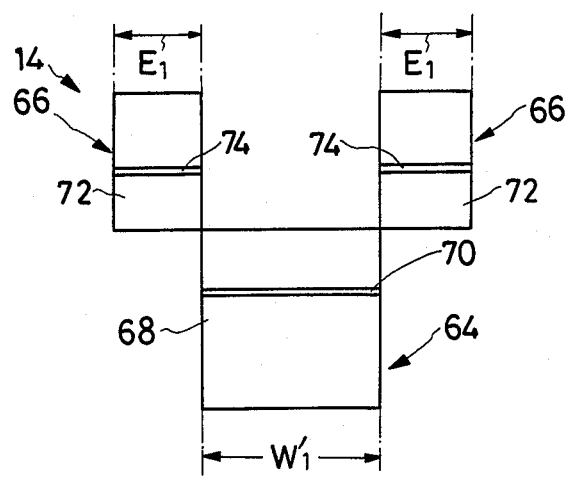
FIG. 3 is a plan view of the magnetic head assembly of the 48-TPI FDD of FIG. 1.
Figure 4:
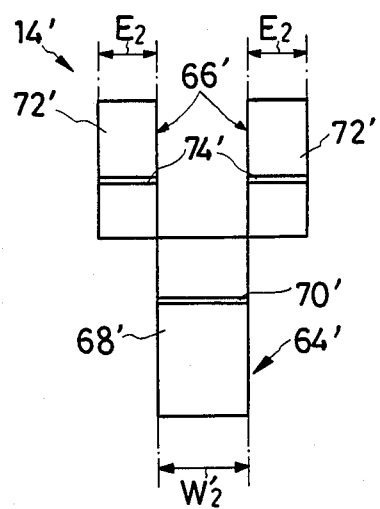
FIG. 4 is a plan view of the magnetic head assembly of the 96-TPI FDD of FIG. 1.

We will now refer to FIGS. 3 and 4 for more detailed description of the magnetic head assemblies 14 and 14' incorporated respectively in the 48-TPI FDD 10 and 96-TPI FDD 10'. With reference to FIG. 3 the 48-TPI head assembly 14 comprises a read/write head 64 and a pair of erase heads 66. The read/write head 64 includes a magnetic core 68 having a read/write gap 70 elongated radially of the floppy disk 12. In this particular embodiment the length W1' (i.e. dimension in a radial direction of the floppy disk) of the read/write gap 70 is 330 micrometers to provide a data track width W1 (FIG. 6) of 300 micrometers. The pair of erase heads 66 are disposed on both sides of the read/write head 64, with an offset therefrom in a tangential direction of the data tracks Tr on the floppy disk 12, for trimming the opposite edges of each data track. Each erase head 66 includes a magnetic core 72 having an erase gap 74 extending parallel to the read/write gap 70. The length E1 (i.e. dimension in a radial direction of the floppy disk 12) of each erase gap 74 is 170 micrometers in this particular embodiment; that is, each erase head 66 can provide an erase width E1 of 170 micrometers.

As will be seen from FIG. 4, the 96-TPI head assembly 14' also comprises a read/write head 64' and a pair of erase heads 66', which are arranged just like the read/write head 64 and erase heads 66 of the 48-TPI head assembly 14. The read/write head 64' includes a magnetic core 68' having a read/write gap 70'. In this particular embodiment the read/write gap 70' has a length W2' (i.e. dimension in a radial direction of the floppy disk 12) of 160 micrometers to provide a data track width W2 (FIGS. 6 and 7) of 155 micrometers. Each erase head 66' includes a magnetic core 72' having an erase gap 74'. The length E2 (i.e. dimension in a radial direction of the floppy disk 12) of each erase gap 74' is 100 micrometers in this particular embodiment, so that each erase head 66' can provide an erase width E2 of 100 micrometers.

Speaking more broadly, for the successful practice of our invention, the width W2 of the data track formed by the 96-TPI head assembly 14' is from about 0.4 to 0.6, preferably from 0.45 to 0.55, and for the best results 0.5, times the width W1 of the data track formed by the 48-TPI head assembly 14. The erase width E2 of each erase head 66' of the 96-TPI head assembly 14' is in the range of $(W1-W2)/2$ to $(P1/2-W2)$.

Figure 5:
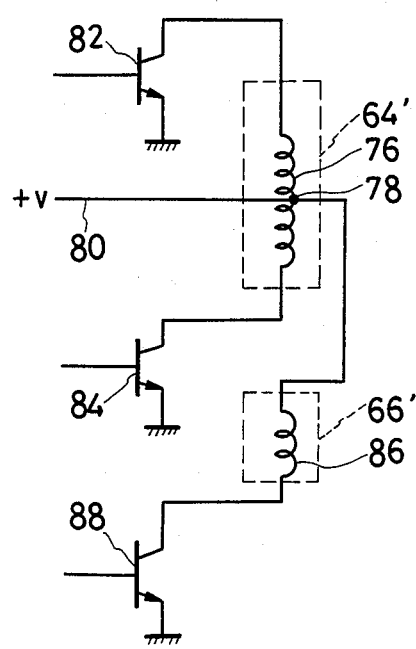
FIG. 5 is a schematic electrical diagram of the head control circuit for the 96-TPI head assembly of FIG. 4.

Since the rewriting of data on the floppy disk 12 is effected by the 96-TPI FDD 10' with its magnetic head assembly 14', we have illustrated in FIG. 5 only the electric circuitry of the 96-TPI head assembly 14'. With reference directed to both FIGS. 4 and 5, the read/write head 64' of the 96-TPI head assembly 14' has a read/write coil 76 wound on its core 68'. The read/write coil 76 is center tapped at 78 for connection with a positive supply line 80. The opposite extremities of the read/write coil 76 are grounded via respective transistors 82 and 84. Although there are two erase coils wound respectively on the cores 72' of the erase heads 66', we have shown only one of them at 86, the two erase coils being electrically interconnected. The erase coils 86 are connected to the center tap 78 on the read/write coil 76 on one hand and, on the other hand, grounded via an additional transistor 88.

For writing or rewriting on the floppy disk 12 by this 96-TPI head assembly 14' the transistor 88 is held conductive to hold the pair of erase coils 86 energized. The other two transistors 82 and 84 are switched on and off to selectively energize the read/write coil 76 as required by the data to be written.

Figure 6:
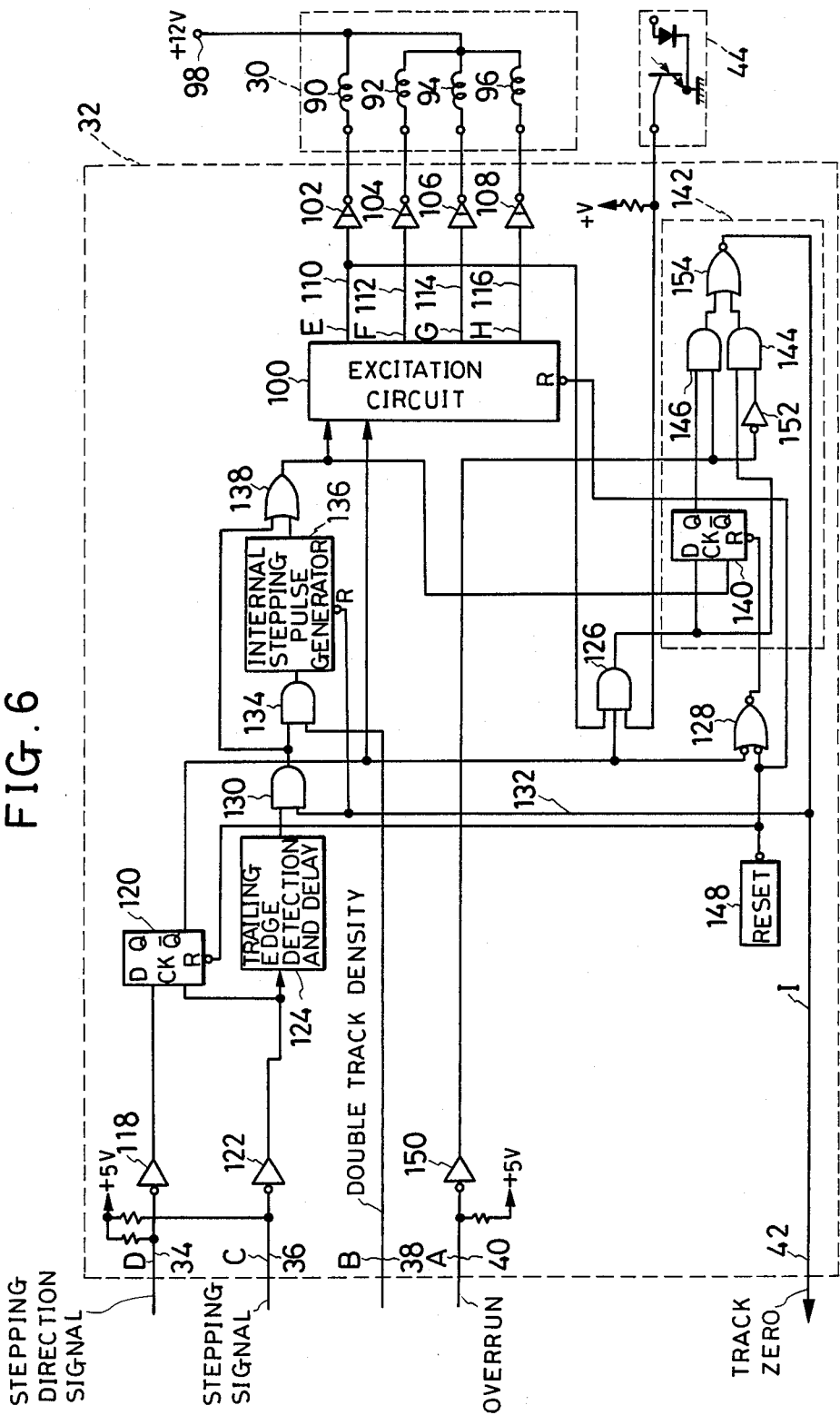
FIG. 6 is a schematic electrical diagram showing in greater detail the stepping motor control and drive circuit of the 96-TPI FDD of FIG. 1, shown together with the stepping motor and Track Zero sensor.

FIG. 6 is a detailed representation of the stepping motor control and drive circuit 32 which has been set forth in connection with FIG. 1 and which is herein shown together with the stepping motor 30 and Track Zero sensor 44. This stepping motor control and drive circuit 32 may be thought of as belonging to the 96-TPI FDD 10' since our invention particularly concerns the rewriting of the floppy disk by that FDD 10'. The stepping motor 30 is shown to be of the four-phase construction, comprising first 90, second 92, third 94 and fourth 96 phase windings. For the simplicity of illustration we have shown only one winding for each phase, even though several electrically interconnected windings are usually provided for joint excitation in one phase of motor operation. Each of the four illustrated windings has one extremity coupled to a +12-volt supply terminal 98. The other extremities of the windings 90, 92, 94 and 96 are connected to an excitation circuit 100 via open-collector NOT circuits 102, 104, 106 and 108, respectively. The exicitaition circuit 100 and NOT circuits 102, 104, 106 and 108 are all included in the control and drive circuit 32.

We understand that the stepping motor 30 is driven by the single phase drive mode in this particular embodiment. Thus, as a series of stepping pulses are supplied to the excitation circuit 100 in a manner to be detailed presently, the excitation signals delivered therefrom to the NOT circuits 102-108 over lines 110, 112, 114 and 116 sequentially go high. The stepping motor windings 90-96 are excited when the associated NOT circuits 102-108 go low.

As has been set forth with reference to FIG. 1, the external host controller 18 is coupled to the stepping motor control and drive circuit 32 of the 96-TPI FDD 10' via the stepping direction signal line 34, stepping signal line 36, "double track density" signal line 38, "overrun" signal line 40 and Track Zero signal line 42. In the stepping motor control and drive circuit 32 the stepping direction signal line 34 and stepping signal line 36 are connected to the excitation circuit 100 via circuit means for selectively conditioning the latter for excitation of the stepping motor 30 in either the 48- or 96-TPI mode. The description of such circuit means follows.

The stepping direction signal line 34 is connected via a NOT circuit 118 to the data input D of a D flip flop 120 whereas the stepping signal line 27 is connected via another NOT circuit 122 to the clock input CK of the D flip flop 120. The stepping signal line 27 is additionally connected to a circuit 124 for delaying the stepping pulses and detecting their trailing edges. The D flip flop 120 has its $\overline{Q}$ output connected to all of the excitation circuit 100, a three-input AND gate 126 and a two-input OR-type AND gate 128. The trailing edge detection and delay circuit 124 has its output connected to one of the two inputs of an AND gate 130, the other input of which is connected via a line 132 to the Track Zero signal line 42 leading to the external host controller 18, FIG. 1. The output of the AND gate 130 is connected via another two-input AND gate 134 to an internal stepping pulse generator circuit 136. The AND gate 134 has its other input connected to the "double track density" signal line 38.

The internal stepping pulse generator circuit 136 comprises a monostable multivibrator triggered by the output pulses of the trailing edge detection and delay circuit 124, and a differentiator which puts out a pulse in response to the trailing edge of each output pulse of the monostable multivibrator. Both monostable multivibrator and differentiator of the internal stepping pulse generator circuit 136 are not shown because of their well known and conventional nature. We will refer to the output pulses of the circuit 136 as the internal stepping pulses in contradistinction from the external stepping pulses fed from the external host controller 18 over the line 36.

The internal stepping pulse generator circuit 136 has a reset input R connected to the Track Zero signal line 42 by way of the internal line 132. The output of the circuit 136 is connected to one of the two inputs of an OR gate 138, the other input of which is connected to the AND gate 130. The output of the OR gate 138 is connected both to the excitation circuit 100 and to the clock input CK of a D flip flop 140 forming a part of a pseudo-Track-Zero signal generator circuit 142. By this circuit 142 the Track Zero signal is fed to the host controller 18 when the head assembly 14' is positioned not on Track Zero but on Track Minus One, at the time of the rewriting of the disk 12. Hence the name "pseudo-Track-Zero" signal, although it could also be named a "pseudo-home-track" signal.

We have mentioned that the AND gate 126 has one of its three inputs connected to the D flip flop 120. The other two inputs of this AND gate 126 are connected respectively to the Track Zero sensor 44 and to the first phase excitation output line 110 of the excitation circuit 100. The output of the AND gate 126 is connected both to the data input D of the D flip flop 140 and to a two-input AND gate 144. The Q output of the D flip flop 140 is connected to another two-input AND gate 146, and the reset input R of the D flip flop 140 is connected to the OR-type AND gate 128. A reset circuit 148 has its output connected to all of the reset input R of the D flip flop 120, the reset input R of the excitation circuit 100, and the OR-type AND gate 128.

The "overrun" signal line 40 from the external host controller 18 is connected via a NOT circuit 150 to the AND gate 146 on one hand and, on the other hand, to the AND gate 144 via another NOT circuit 152. The outputs of the AND gates 144 and 146 are both connected to an OR-type NOR gate 154, whose output is connected to the Track Zero signal line 42 for the delivery of the Track Zero signal or pseudo-Track-Zero signal to the external host controller 18.

The D flip flop 140, AND gates 144 and 146, NOT circuit 152 and NOR gate 154 constitute in combination the pseudo-Track-Zero signal generator circuit 142.

OPERATION

Figure 7:
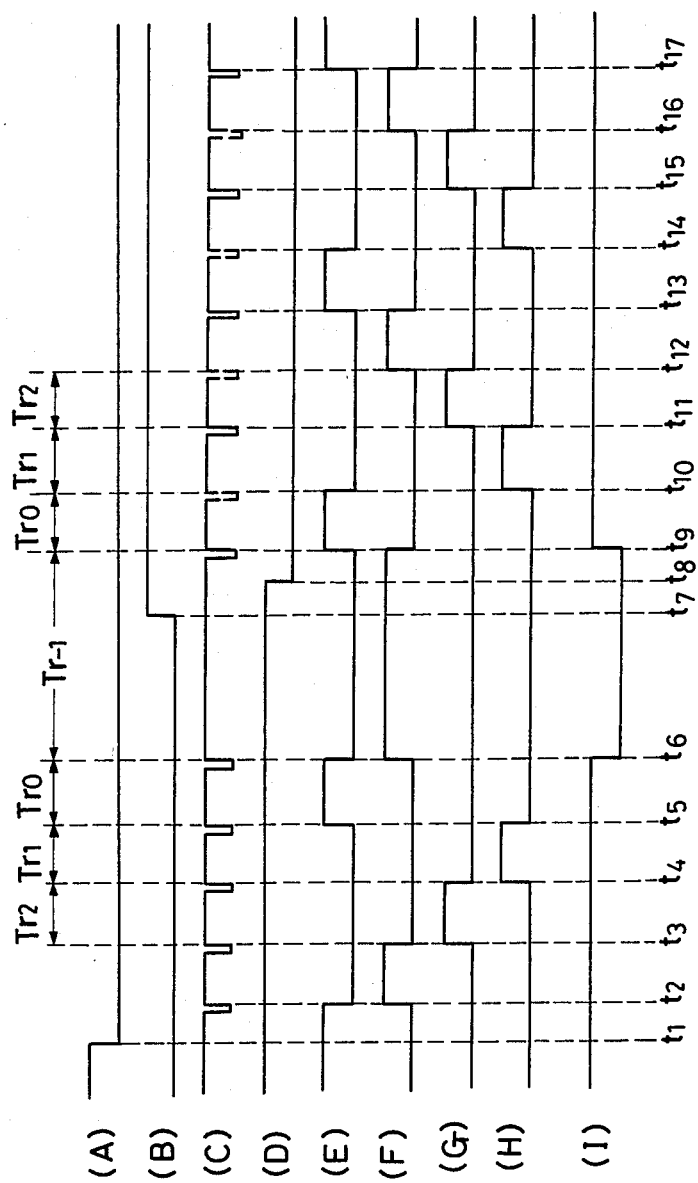
FIG. 7A through I is a waveform diagram showing the voltage waveforms appearing in various parts of the circuitry of FIG. 6.

In the course of the following operational description we will refer to FIG. 7 which diagrammatically represents at (A) through (I) the voltage waveforms useful in explaining the operation of the stepping motor control and drive circuit 32 of the 96-TPI FDD 10'. In FIG. 6 we have indicated by the capitals A through I the parts where the corresponding waveforms (A) through (I) of FIG. 7 appear, for the ease of understanding.

Figure 8:
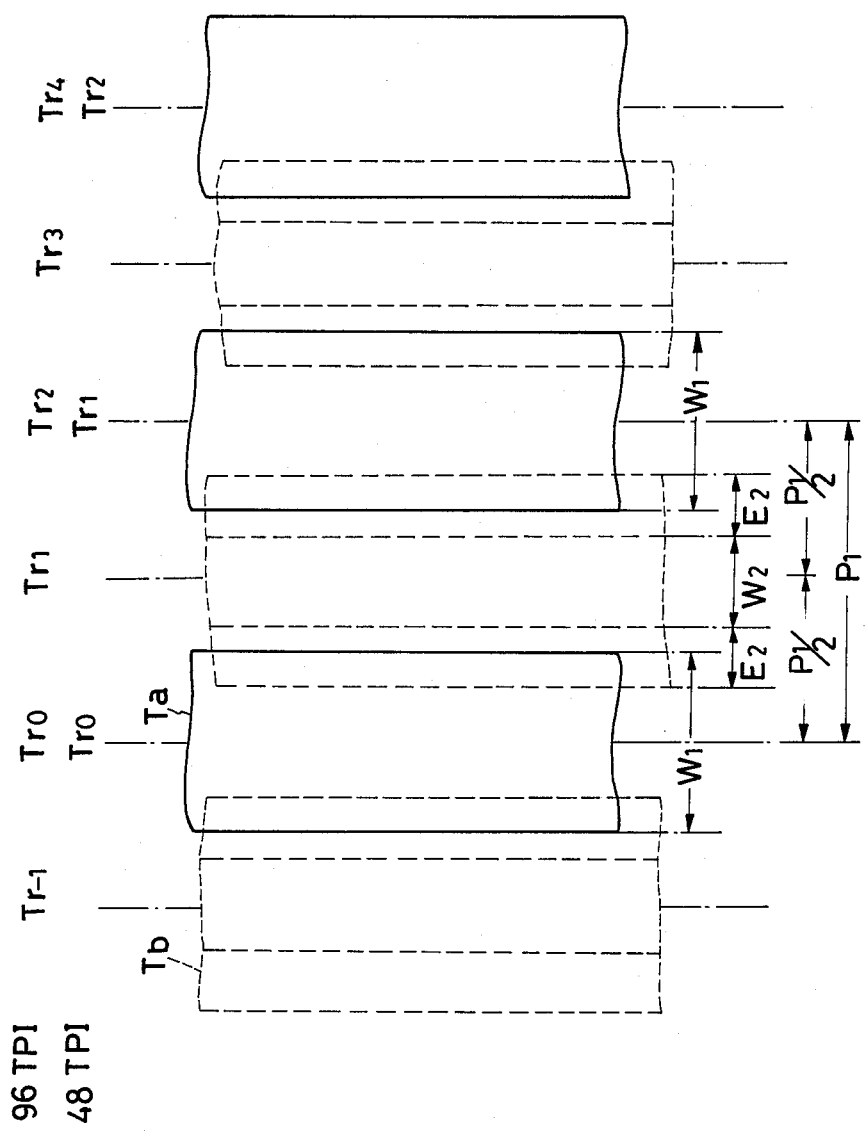
FIG. 8 is an enlarged, fragmentary diagram explanatory of the way in which the data tracks formed on the floppy disk of FIG. 2 by the 48-TPI FDD of FIG. 1 have their opposite edge portions erased in accordance with our invention.

Let us suppose that information has been written on the floppy disk 12 by the 48-TPI FDD 10 incorporating the magnetic head assembly 14 of FIG. 3. FIG. 8 show by the solid lines parts of some of the data tracks Ta thus formed on the floppy disk 12. The width W1 of each data track Ta is 300 micrometers. The track pitch P1 is 529 micrometers. The track density is, of course, 48 TPI. This floppy disk 12 can be rewritten, either wholly or in part, by the 96-TPI FDD 10' incorporating the magnetic head assembly 14' of FIG. 4 and the stepping motor control and drive circuit 32 of FIG. 6. Such rewriting requires the erasure of the opposite edge portions of the data tracks either before or after the rewriting, as set forth in detail hereafter.

First, with the floppy disk 12 to be rewritten loaded in the 96-TPI FDD 10', the external host controller 18 may be set in the erase mode. Thereupon, as indicated at (A) in FIG. 7, the "overrun" signal fed from the controller 18 over the line 40 will go low at a moment t1, thereby directing the positioning of the head assembly 14' on the notional Track Minus One indicated at Tr-1 in FIG. 8. At this moment the "double track density" signal, also fed from the controller 18 over the line 38, will also be low, as at (B) in FIG. 7, indicating that the required track density is 96 TPI. At the same time, for the initialization of the position of the head assembly 14' on the floppy disk 12, the controller 18 will deliver a series of "negative" external stepping pulses over the line 36, as at (C) in FIG. 7, and a high stepping direction signal over the line 34, as at (D) in FIG. 7, for stepping the head assembly 14 in a radially outward direction of the floppy disk 12. As indicated by the solid lines at (C) in FIG. 7, the external stepping pulses will appear at relatively short intervals, as at moments t2, t3, t4, t5 and t6, until the moment t7 when the "double track density" signal goes high to dictate a track density of 48 TPI.

As shown at (I) in FIG. 7, the Track Zero signal over the line 42 remains high until the moment t6, so that the AND gate 130 is enabled during that time. However, the AND gate 134 is disabled as the "double track density" signal is low. Consequently, the internal stepping pulse generator circuit 136 produces no internal stepping pulses. The external stepping pulses of the high repetition rate over the line 36 are delivered to the excitation circuit 100 via the NOT circuit 122, trailing edge detection and delay circuit 124, AND gate 48 and OR gate 138. Therefore, as will be seen from (E)–(H) in FIG. 7, the excitation circuit 100 will sequentially put out excitation pulses over the lines 110, 112, 114 and 116 thereby causing the windings 90, 92, 94 and 96 of the stepping motor 30 to be sequentially energized for incrementing the head assembly 14' in a radially outward direction of the floppy disk 12.

The trailing edge detection and delay circuit 124 internally generates pulses in synchronism with the trailing edges of the incoming stepping pulses and slightly delays the internally generated pulses. Further the circuit 124 puts out the trailing edge detection signal (stepping signal) after the inversion of the stepping direction signal over the line 34 has been latched by the D flip flop 120.

Until the moment t7 the $\overline{Q}$ output from the D flip flop 120 is high, dictating the radially outward travel of the head assembly 14', as the inversion of the stepping direction signal shown at (D) in FIG. 7 is latched by the D flip flop 120. When the head assembly 14' reaches Track Zero Tr0, the Track Zero sensor 44 will go high as at a moment t5 in FIG. 7. We understand that this FDD 10' is conventionally constructed and adjusted so that the first phase winding 90 of the stepping motor 30 is being energized when the head assembly 14' reaches Track Zero. Therefore, at this moment, the AND gates 126 goes high since then the Track Zero sensor 44, the first phase excitation output line 110 of the excitation circuit 100, and the $\overline{Q}$ output of the D flip flop 120 are all high.

However, since the "overrun" signal from the host controller 18 has been held low since the moment t1, as at (A) in FIG. 7, the pseudo-Track-Zero signal generator circuit 142 functions to hold the Track Zero signal over the line 42 high despite the high output from the AND gate 126. Going high at the moment t5 as aforesaid, the output from the AND gate 126 is latched by the D flip flop 140 of the pseudo-Track-Zero signal generator circuit 142 in synchronism with the leading edge of the next external stepping pulse supplied at the moment t6, so that the Q output of the D flip flop 140 will go high at this moment. As the Q output of this flip flop has been low until the moment t6, the outputs from both AND gates 144 and 146 have been low, holding the output from the NOR gate 154 high as at (I) in FIG. 7. As the Q output of the D flip flop 140 goes high at the moment t6, the AND gate 146 will go low, making the NOR gate 154 go low as at (I) in FIG. 7. Thus the pseudo-Track-Zero signal goes low at the moment t6, indicating that the head assembly 14 has reached Track Zero Tr0 on the floppy disk 12 even though, actually, the head assembly has overrun Track Zero and reached Track Minus One Tr-1. An inspection of this figure will show that the track Tr-1 is spaced half the pitch P1 from Track Zero Tr0 in a radially outward direction of the disk 12. It is to be noted that Track Minus One Tr-1 is merely an imaginary track on which the head assembly 14' is initialized prior to the partial erasure of the old data tracks Ta. No data is to be written on this track in either the 48- or 96-TPI mode.

The next step of the erase program built into the external host controller 18 is the erasure or trimming of the opposite longitudinal edge portions of the data tracks formed by the 48-TPI FDD 10. Such partial erasure of the existing data tracks requires the positioning of the 96-TPI head assembly 14' on what are to become the odd-numbered tracks on the floppy disk 12 in the double density (96-TPI) track format. Toward this end the "double track density" signal from the controller 18 will go high at the moment t7, as at (B) in FIG. 7, to indicate the 48 TPI track density. Further, at the subsequent moment t8, the stepping direction signal from the controller 18 will become low, as at (D) in FIG. 7, for stepping the head assembly 14' radially inwardly of the floppy disk 12.

During the time interval from moment t7 to moment t9, when the second phase winding 92 of the stepping motor 30 is being energized, a direct current is fed, just when the index sensor 52 senses the index hole 54 in the floppy disk 12, not only to the erase coils 54, FIG. 5, but also to the read/write coil 76 of the head assembly 14'. The read/write head 64' of the head assembly 14' will then function as erase head, provided that the delivery of write data to the read/write head is inhibited, and that one of the transistors 82 and 84, FIG. 5, is held conductive. The head assembly 14' is now scanning the dashed region Tb, FIG. 8, of Track Minus One Tr-1. Such being the total width of the head assembly 14', inclusive of the read/write head 64' and the pair of erase heads 66', it will be observed from FIG. 8 that the left hand edge portion of Track Zero Tr0 which has been written by the head assembly 14 of the 48-TPI FDD 10 can be erased by the 96-TPI head assembly 14' as the latter scans the dashed region Tb in the noted erase mode.

As has been set forth in connection with FIGS. 3 and 4, the width W1 of each 48-TPI track is 300 micrometers, the width W2 of each 96-TPI track is 155 micrometers, and the dimension E2 of each erase gap 74' of the 96-TPI head assembly 14' is 100 micrometers, in this particular embodiment. If then the pitch distance between Track Minus One Tr-1 and Track Zero Tr0 is 264.5 micrometers, the left hand edge portion of Track Zero Tr0 will be erased to a width of 43 micrometers as the 96-TPI head assembly 14' scans the dashed region Tb as in the foregoing.

Supplied at a moment t9, slightly after the moment t8 when the stepping direction signal goes low, the stepping pulse will be directed through the NOT circuit 122, trailing edge detection and delay circuit 124, AND gate 130 and OR gate 138 into the excitation circuit 100. Thereupon, as shown at (E) in FIG. 7, the first phase winding 90 of the stepping motor 30 will be excited for stepping the head assembly 14' to Track Zero Tr0 which has been partly erased. The head assembly 14' is not set in the erase mode when in this track position.

After the moment t7, when the "double track density" signal goes high to dictate the 48-TPI density, the external stepping pulses are free to pass through the AND gate 134. Inputting these external stepping pulses, the internal stepping pulse generator circuit 136 will put out internal stepping pulses by, essentially, delaying the external stepping pulses by half their spacing. The internal stepping pulses, indicated by the dashed lines at (C) in FIG. 7, are interleaved with the solid-line external stepping pulses by the OR gate 138, and both external and internal stepping pulses are fed into the excitation circuit 100.

Since the stepping direction signal is now low as at (D) in FIG. 7, the excitation circuit 100 will respond to the internal stepping pulse of the moment t10 to cause excitation of the fourth phase winding 96 of the stepping motor 30 as at (H) in FIG. 7. The head assembly 14' will then step inwardly to what is to become Track One Tr1 in the 96-TPI track format, as indicated by the dashed lines in FIG. 8. Then, in response to the subsequent detection of the index hole 54 by the index sensor 52, the host controller 18 will set both read/write head 64' and erase heads 66' of the head assembly 14' in the erase mode by causing their coils 76 and 86 to be fed with a direct current. Thus the head assembly 14' will erase the right hand edge portion, as seen in FIG. 8, of Track Zero Tr0, on which data has been written by the 48-TPI FDD 10. The remaining part of Track Zero Tr0 is 214 micrometers in width.

Thereafter the same procedure is repeated for successively erasing the opposite edge portions of Track One Tr1, Track Two Tr2, etc., of the 48-TPI format on which data has been written by the 48-TPI FDD 10. After the moment t10 the excitation circuit 100 inputs the external stepping pulses as at moments t11, t13, t15 and t17 and the internal stepping pulses as at moments t12, t14 and t16. Therefore, despite the longer intervals of the external stepping pulses supplied actually, the combination of the external and internal stepping pulses enable the head assembly 14' to be positioned intermediate the existing data tracks, as illustrated by the dashed lines in FIG. 8. For erasing the radially inside edge portion of the inmost track Trn, FIG. 2, the head assembly 14' is positioned radially inwardly of that track.

Figure 9:
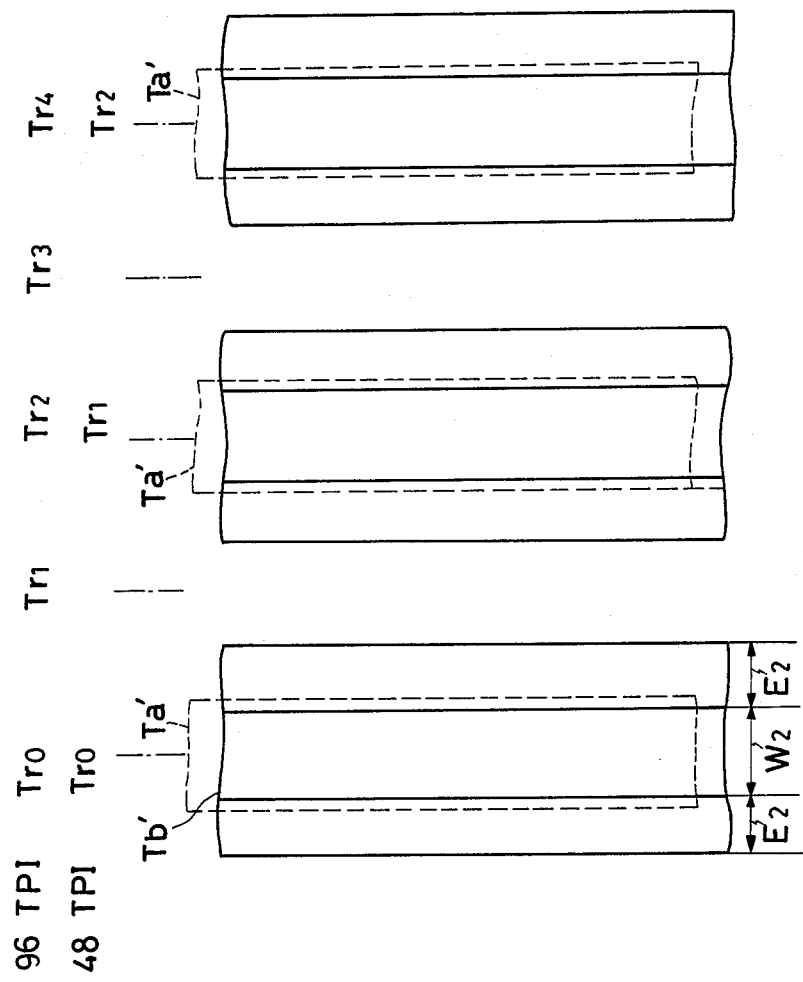
FIG. 9 is a diagram similar to FIG. 8 and explanatory of the way in which new data is written on the old data tracks of reduced width in accordance with our invention.

Each having had its opposite longitudinal edge portions trimmed off as in the foregoing, the data tracks of reduced width (214 micrometers) are depicted by the dashed lines designated Ta' in FIG. 9.

Next comes the step of thoroughly erasing the old data tracks Ta' of reduced width by rewriting new data thereon by the 96-TPI FDD 10'. Track Zero of the 48-TPI format and that of the 96-TPI format are in alignment. Therefore, as shown in FIG. 9, the new data tracks Tb' can be formed on the old data tracks Ta' of reduced width. Each new data track Tb', formed by the read/write gap 70' of the 96-TPI head assembly 14', has a width W2 of 155 micrometers, whereas each old data track Ta' to be erased has a longer width 214 micrometers. However, as each new data track Tb' is formed the read/write head 64', the pair of erase heads 66' are also held in operation. Each erase head 66' has an erase gap 74' with the dimension E2 of 100 micrometers. Accordingly, the old data tracks Ta' of reduced width can be thoroughly erased as the new data tracks Tb' are re-created thereon in the 48-TPI format by the 96-TPI head assembly 14'.

The floppy disk 12 bearing the new data tracks Tb' of FIG. 9 is readable by the 48-TPI FDD 10 having the head assembly 14 of FIG. 3. Each new data track Tb' has a width of 155 micrometers whereas the 48-TPI head assembly 14 has the read/write gap 70 with the dimension W1' of as much as 330 micrometers. It is therefore possible to completely scan the new data tracks Tb', and the new data will be read without errors, too, because the old data has been entirely erased.

Of course, the 96-TPI FDD 10' lends itself to data transfer with the floopy disk 12 in the 96-TPI mode. For such normal operation of the 96-TPI FDD 10' the "double track density" signal from the external host controller 18 will be low to indicate the 96-TPI density, and the "overrun" signal therefrom will be high to prevent the head assembly 14' from overrunning the boundaries of the data storage region 58 of the floppy disk 12. The AND gate 134 of the stepping motor control and drive circuit 32 will then block the passage of the external stepping pulses therethrough and so prevent the internal stepping pulse generator circuit 136 from producing internal stepping pulses. In response to each incoming external stepping pulse the excitation circuit 100 will cause the stepping motor 30 to step the head assembly 14' from one track to the next in the 96-TPI density.

Also, since the "overrun" signal is now high as aforesaid, the AND gate 146 will block the output from the D flip flop 140 whereas the AND gate 144 will permit the passage therethrough of the output from the AND gate 126. Consequently, when the head assembly 14' is positioned on Track Zero, the Track Zero signal over the line 42 will go low, as at the moment t5 in FIG. 7 instead of at the moment t6. Thus the head assembly 14' can be correctly initialized on the home track for the commencement of reading or writing in the 96-TPI mode.

The states of the "double track density" signal Sa and "overrun" signal Sb in the various modes of operation of the 96-TPI FDD 10' may be summarized as follows:

1. During movement of the head assembly 14' to Track Minus One Tr-1:
Sa=High and/or low.
Sb=Low.
2. During erasure of the opposite longitudinal edge portions of old 48-TPI data tracks:
Sa=High.
Sb=Low.
3. During reading or writing in the 96-TPI mode:
Sa=Low.
Sb=High.
4. During rewriting on 48-TPI data tracks:
Sa=High.
Sb=Low.

Despite the foregoing detailed disclosure we do not wish our invention to be limited by the exact details of the illustrated embodiment. The following is a list of some of the various possible modifications, alterations or adaptations of the illustrated embodiment which we believe all fall within the scope of our invention:

1. It is not essential that the opposite edge portions of old 48-TPI data tracks be erased before the disk is rewritten; instead, the edge portions of the old data tracks may be erased after the writing of new data.

2. The true Track Zero signal may be fed directly to the host controller when the head assembly is positioned on Track Zero, and a separate Track Minus One signal may be produced for delivery to the host controller.

3. The host controller itself may be constructed for controlling the positioning of the head assembly on Track Minus One in response to the true Track Zero signal.

4. Only one or some of the old 48-TPI data tracks may have its or their opposite edge portions trimmed off by the 96-TPI FDD, even though it may be more convenient to erase the opposite edge portions of all the 48-TPI data tracks preparatory to rewriting.

5. The 48- and 96-TPI track densities of the illustrated embodiment are by way of example only; thus, to give another example, a 67.5-TPI disk may be rewritten by a 135-TPI FDD.

What we claim is:

1. A method of rewriting on a magnetic disk on which data has been written by a first disk drive on a plurality of concentric data tracks, the data tracks being arranged on the magnetic disk with a prescribed pitch P1 and each having a width W1, which method comprises:

(a) providing a second disk drive comprising a magnetic head assembly having both a read/write head and a pair of erase heads disposed on both sides of the read/write head, the read/write head having a read/write gap capable of providing a track width W2 which is in the range of 0.4 W1 to 0.6 W1, each erase head having an erase gap capable of providing an erase width E2 which is in the range of (W1−W2)/2 to (P1/2−W2);

(b) erasing a pair of opposite edge portions of each data track on the magnetic disk by successively positioning the head assembly intermediate the data tracks, with at least the pair of erase heads of the head assembly maintained in operation for the partial erasure of the data tracks; and (c) rewriting on the data tracks on the magnetic disk by successively positioning the head assembly thereon, with the pair of erase heads of the head assembly maintained in operation during the rewriting of the data.

2. The method of claim 1 wherein the read/write head of the head assembly is maintained in operation in an erase mode along with the pair of erase heads during the partial erasure of the data tracks.

3. The method of claim 1 wherein the partial erasure of the data tracks is effected before the rewriting on the data tracks.

4. The method of claim 1 wherein the rewriting on the data tracks is effected before the partial erasure of the data tracks.

5. A method of rewriting on a magnetic disk on which data has been written by a first disk drive on a plurality of concentric data tracks, the data tracks being arranged in a data storage region on the magnetic disk with a prescribed pitch P1 and each having a width W1, the data tracks including a home track at a boundary between the data storage region and a non-data-storage region of the magnetic disk, which method comprises:
  (a) providing a second disk drive capable of data transfer with the magnetic disk with a track density twice as high as that of the existing data tracks on the magnetic disk, the second disk drive comprising a magnetic head assembly having both a read/write head and a pair of erase heads disposed on both sides of the read/write head, the read/write head having a read/write gap capable of providing a track width W2 which is in the range of 0.4 W1 to 0.6 W1, each erase head having an erase gap capable of providing an erase width E2 which is in the range of (W1−W2)/2 to (P1/2−W2);
  (b) erasing an edge portion of the home track by positioning the head assembly in the non-data-storage region of the magnetic disk and at a distance of half the pitch P1 from the home track in a radial direction of the magnetic disk, with at least the erase heads of the head assembly held in operation for the partial erasure of the home track;
  (c) similarly erasing another edge portion of the home track and a pair of opposite edge portions of each of the other data tracks by successively positioning the head assembly intermediate the data tracks, with at least the pair of erase heads of the head assembly maintained in operation for the partial erasure of the data tracks;
  (d) rewriting on the data tracks on the magnetic disk by successively positioning the head assembly thereon, with the pair of erase heads of the head assembly maintained in operation during the rewriting of the data.

6. The method of claim 5 wherein the read/write head of the head assembly is maintained in operation in an erase mode along with the pair of erase heads during the partial erasure of the data tracks.

7. The method of claim 5 wherein the partial erasure of the data tracks including the home track is effected before the rewriting on the data tracks.

8. The method of claim 5 wherein the rewriting on the data tracks is effected before the partial erasure of the data tracks including the home track.

9. Apparatus for data transfer with a magnetic disk, which apparatus is capable of rewriting on a magnetic disk on which data has been written on a plurality of concentric data tracks arranged with a prescribed pitch P1, each data track having a width W1, the apparatus comprising:
  (a) disk drive means for imparting rotation to the magnetic disk;
  (b) a magnetic head assembly having a read/write head and a pair of erase heads disposed on both sides of the read/write head, the read/write head having a read/write gap capable of providing a track width W2 which is in the range of 0.4 W1 to 0.6 W1, each erase head having an erase gap capable of providing an erase width E2 which is in the range of (W1−W2)/2 to (P1/2−W2);
  (c) head control means for setting the read/write head and erase heads of the head assembly in and out of operation;
  (d) head positioning means including a head positioning motor for incrementally transporting the head assembly across the data tracks on the magnetic disk;
  (e) first circuit means connected to the head positioning motor for causing the head positioning means to position the head assembly on any selected one of the data tracks on the magnetic disk;
  (f) second circuit means associated with the first circuit means for causing the head positioning means to successively position the head assembly intermediate the data tracks on the magnetic disk;
  (g) whereby the apparatus can thoroughly erase the existing data tracks on the magnetic disk and rewrite thereon by successively positioning the head assembly intermediate the data tracks for erasing a pair of opposite edge portions of each data track, with at least the pair of erase heads of the head assembly held in operation, and by successively positioning the head assembly on the data tracks for rewriting thereon, with the pair of erase heads of the head assembly maintained in operation during the rewriting.

10. The apparatus of claim 9 wherein the track width W2 is about 0.5 W1.

11. The apparatus of claim 9 wherein the track width W1 is about 300 micrometers, and the track width W2 is about 155 micrometers.

12. Apparatus for data transfer with a magnetic disk, which apparatus is capable of rewriting on a magnetic disk on which data has been written on a plurality of concentric data tracks each having a width W1, the data tracks being arranged with a prescribed pitch P1 in a data storage region of the magnetic disk and including a home track at a boundary between the data storage region and a non-data-storage region of the magnetic disk, the apparatus comprising:
  (a) disk drive means for imparting rotation to the magnetic disk;
  (b) a magnetic head assembly having a read/write head and a pair of erase heads disposed on both sides of the read/write head, the read/write head having a read/write gap capable of providing a track width W2 which is in the range of 0.4 W1 to 0.6 W1, each erase head having an erase gap capable of providing an erase width E2 which is in the range of (W1−W2)/2 to (P1/2−W2);
  (c) head control means for setting the read/write head and erase heads of the head assembly in and out of operation;
  (d) head positioning means including a head positioning motor for incrementally transporting the head assembly across the data tracks on the magnetic disk;
  (e) first circuit means connected to the head positioning motor for causing the head positioning means to position the head assembly on any selected one of the data tracks on the magnetic disk;
  (f) sensor means for producing a home track signal indicative of the fact that the head assembly is positioned on the home track on the magnetic disk;

(g) second circuit means associated with the first circuit means for causing the head positioning means to position the head assembly at a distance of half the pitch P1 in either direction from each data track on the magnetic disk;

(h) "overrun" signal input means for inputting an "overrun" signal directing the positioning of the head assembly on a notional track which is located in the non-data storage region of the magnetic disk and which is distanced half the pitch P1 from the home track;

(i) third circuit means connected to both the sensor means and the "overrun" signal input means for producing a pseudo-home-track signal when the head assembly is positioned on the notional track on the magnetic disk; and (j) "double track density" signal input means connected to the second circuit means for delivering thereto a "double track density" signal directing the positioning of the head assembly at a distance of half the pitch P1 in either direction from each data track after the head assembly has been positioned on the notional track.

* * * * *